(12) United States Patent
Xu et al.

(10) Patent No.: US 12,472,684 B2
(45) Date of Patent: Nov. 18, 2025

(54) THREE-DIMENSIONAL FORMING METHOD AND SYSTEM

(71) Applicant: REGENOVO BIOTECHNOLOGY CO., LTD., Zhejiang (CN)

(72) Inventors: Ming'en Xu, Zhejiang (CN); Keke Chen, Zhejiang (CN); Xiaoyun Wei, Zhejiang (CN); Ling Wang, Zhejiang (CN)

(73) Assignee: REGENOVO BIOTECHNOLOGY CO., LTD., Zhejiang (CN)

( * ) Notice: Subject to any disclaimer, the term of this patent is extended or adjusted under 35 U.S.C. 154(b) by 8 days.

(21) Appl. No.: 18/555,216

(22) PCT Filed: Nov. 15, 2021

(86) PCT No.: PCT/CN2021/130662
§ 371 (c)(1),
(2) Date: Oct. 12, 2023

(87) PCT Pub. No.: WO2023/019772
PCT Pub. Date: Feb. 23, 2023

(65) Prior Publication Data
US 2024/0198580 A1    Jun. 20, 2024

(30) Foreign Application Priority Data
Aug. 16, 2021 (CN) .......................... 202110935366.8

(51) Int. Cl.
*B29C 64/124* (2017.01)
*B29C 64/264* (2017.01)
(Continued)

(52) U.S. Cl.
CPC .......... *B29C 64/124* (2017.08); *B29C 64/264* (2017.08); *B29C 64/30* (2017.08);
(Continued)

(58) Field of Classification Search
None
See application file for complete search history.

(56) References Cited

U.S. PATENT DOCUMENTS

| 2017/0001439 A1* | 1/2017 | Foresti .................. B29C 64/112 |
| 2019/0031999 A1 | 1/2019 | Suresh et al. |

(Continued)

FOREIGN PATENT DOCUMENTS

| CN | 106399078 A | 2/2017 |
| CN | 106821543 A | 6/2017 |

(Continued)

OTHER PUBLICATIONS

Guo et al, Three-dimensional manipulation of single cells using surface acoustic waves, PNAS, 2016, vol. 113, No. 6 (Year: 2016).*

(Continued)

*Primary Examiner* — Timothy Kennedy
(74) *Attorney, Agent, or Firm* — Barnes & Thornburg LLP (57) ABSTRACT

Provided are three-dimensional forming method and system. The method includes: controlling, by acoustic wave, bio-ink in acoustic resonant cavity to form cell cluster pattern M1; performing controllable photocuring on pre-curing position of the cell cluster pattern M1, to obtain cured formed structure; transferring the cured formed structure; controlling, by acoustic wave, the bio-ink in the acoustic resonant cavity to form cell cluster pattern M2, and adjusting the position, in the bio-ink, of the cured formed structure, such that the position is accurately joined with pre-curing position of the cell cluster pattern M2; performing controllable photocuring on the pre-curing position of the cell cluster pattern M2, to obtain cured formed structure; and circularly executing steps 3-5 a preset number of times, to obtain the three-dimensional tissue structure.

6 Claims, 3 Drawing Sheets

(51) Int. Cl.
*B29C 64/30* (2017.01)
*B33Y 10/00* (2015.01)
*B33Y 30/00* (2015.01)
*B33Y 40/00* (2020.01)

(52) U.S. Cl.
CPC .............. *B33Y 10/00* (2014.12); *B33Y 30/00* (2014.12); *B33Y 40/00* (2014.12)

(56) References Cited

U.S. PATENT DOCUMENTS

2020/0276756 A1* 9/2020 Sriphutkiat ............ B33Y 70/00
2021/0155897 A1* 5/2021 Serra ..................... B29C 64/165
2021/0260578 A1* 8/2021 Shirwaiker ............ C12N 13/00

FOREIGN PATENT DOCUMENTS

| CN | 107320779 A | 11/2017 |
|---|---|---|
| CN | 109381749 A | 2/2019 |
| CN | 111254076 A | 6/2020 |
| CN | 111421815 A | 7/2020 |
| CN | 111572019 A | 8/2020 |
| CN | 111655835 A | 9/2020 |
| CN | 112776325 A | 5/2021 |
| CN | 113601834 A | 11/2021 |
| EP | 3771547 A1 | 2/2021 |
| WO | 2016/069493 A2 | 5/2016 |

OTHER PUBLICATIONS

Naseer et al, Surface acoustic waves induced micropatterning of cells in gelatin methacryloyl (GelMA) hydrogels, Biofabrication, 2017, vol. 9, No. 1 (Year: 2017).*
Wang et al, Standing surface acoustic wave-assisted fabrication of patterned microstructures for enhancing cell migration, Bio-Design and Manufacturing, 2020, vol. 3 (Year: 2020).*
Jiang et al, Surface acoustic wave (SAW) techniques in tissue engineering, Cell and Tissue Research, 2021, vol. 386 (Year: 2021).*
International Search Report of WO2023019772 (PCT/CN2021/130662), mailed May 9, 2022 (English translation included).
Notice of Grant of Invention Patent Right of CN 202110935366.8 dated May 15, 2023 (English translation included).
First Office Action of CN 202110935366.8, undated (English translation included).
First search of priority application CN 2021109353668 (undated), filed Aug. 16, 2021.
Written Opinion of The International Searching Authority of WO2023019772 (PCT/CN2021/130662), dated May 9, 2022 (English translation included).

* cited by examiner

THREE-DIMENSIONAL FORMING METHOD AND SYSTEM

CROSS-REFERENCES TO RELATED APPLICATIONS

The present disclosure is a national phase entry of PCT/CN2021/130662, entitled "Three-Dimensional Forming Method and System", filed on Nov. 15, 2021 and claims the benefit of priority to the Chinese patent application with the filing No. 2021109353668, entitled "Three-Dimensional Forming Method and System" filed with the Chinese Patent Office on Aug. 16, 2021, the entire contents of each of which are incorporated herein by reference.

TECHNICAL FIELD

The present disclosure belongs to the technical field of tissue engineering, and in particular, relates to a three-dimensional forming method and system thereof.

SUMMARY

The purpose of the present disclosure is to provide a three-dimensional forming method and system thereof, which can realize printing of three-dimensional tissue structure through the coupling of acoustic waves and light-curing (i.e., photo-curing) technology, so as to realize the printing capable of adjusting the number and position of cells, thereby improving the accuracy and efficiency for printing three-dimensional heterogeneous tissue structure.

In the first aspect, the embodiment of the present disclosure provides a three-dimensional forming method, wherein the method includes: Step 1: controlling the bio-ink in the acoustic resonating cavity through acoustic waves to form a cell cluster pattern M1; Step 2: performing controllable light-curing on the pre-cured position of the cell cluster pattern M1 to obtain a cured formed structure; Step 3: transferring the cured formed structure; Step 4: controlling the bio-ink in the acoustic resonating cavity through acoustic waves to form a cell cluster pattern M2, and adjusting the position of the cured formed structure in Step 3 in the bio-ink, so as to accurately splice with the pre-cured position of the cell cluster pattern M2; Step 5: performing controllable light-curing on the pre-cured position of the cell cluster pattern M2 to obtain a cured formed structure; and recurrently performing the above steps 3-5 for preset times, so as to obtain a three-dimensional tissue structure.

In an optional embodiment, the above-mentioned step of controlling the bio-ink in the acoustic resonating cavity through acoustic waves to form a cell cluster pattern includes: adjusting the number of currently working transducer modules and adjusting the current input phase corresponding to each transducer module in working state, so that the acoustic waves generated by the above-mentioned transducer module in the working state under the current input phase control the cells in the bio-ink in the acoustic resonating cavity to form a cell cluster pattern.

In an optional embodiment, in the above step 3, after transferring the cured formed structure, the method includes determining whether to replace the bio-ink in the acoustic resonating cavity or not according to requirements on the design of the three-dimensional tissue structure, including when a homogeneous three-dimensional tissue structure is printed, replacing the bio-ink in the acoustic resonating cavity according to the remaining amount of the bio-ink after used or requirement on the cell concentration; and when a heterogeneous three-dimensional tissue structure is printed, replacing the bio-ink in the acoustic resonating cavity according to the requirements on the design of the cell type in the three-dimensional tissue structure.

In an optional embodiment, the accurate splicing of the positions in above-mentioned step 4 includes: when the two adjacent pre-cured positions are at the same layer, adjusting the immersion depth of the cured formed structure in the bio-ink to ensure that the distance between the top of the current printed layer structure and the focal plane of the digital light source is in the range of the light-curing forming; and when the two adjacent pre-cured positions are in different layers, adjusting the immersion depth of the cured formed structure in the bio-ink to ensure that the distance between the bottom of the cured formed structure and the focal plane of the digital light source is in the range of light-curing forming.

In an optional embodiment, the accurate splicing of the positions in above-mentioned step 4 also includes the repeated positioning for two adjacent pre-cured positions in the three directions of X/Y/Z in the bio-ink for accurate splicing.

In an optional embodiment, the above-mentioned step of performing controllable light-curing on the pre-cured position of the cell cluster pattern to obtain a cured formed structure includes: acquiring an imaging picture corresponding to the cell cluster pattern, and converting the imaging picture into a schematic view of the simulated curing; and issuing the corresponding digital photomask according to the schematic view of simulated curing and then focusing on the bottom surface of the acoustic resonating cavity, thereby realizing the selective curing for the cell cluster pattern to obtain the cured formed structure.

In the second aspect, the embodiment of the present disclosure provides a three-dimensional forming system, which is configured to perform the steps of the method described in the previous aspect, wherein the system includes an acoustic device and a light-curing control system, wherein the acoustic device includes an acoustic resonating cavity for storing bio-ink; and the light-curing control system includes a terminal equipment, a digital light source and a three-dimensional axis motion control system, wherein the acoustic device is configured to control the cells in the bio-ink in the acoustic resonating cavity through acoustic waves to form a cell cluster pattern; the three-dimensional axis motion control system is configured to transfer the cured formed structure to replace new bio-ink in the acoustic resonating cavity; and the terminal equipment and digital light source is configured to perform controllable light-curing processing at a pre-cured position of the cell cluster pattern to obtain a cured formed structure.

In an optional embodiment, the above-mentioned acoustic device also includes a plurality of transducer modules, wherein the plurality of transducer modules are arranged on the periphery of the acoustic resonating cavity; and each transducer module is controlled by a circuit switch, wherein the above circuit switch is configured to adjust the number of current working transducer modules, and the current input phase corresponding to each transducer module in the working state, so that the acoustic wave generated by the transducer modules in the working state under the current input phase controls the cells in the bio-ink in the acoustic resonating cavity to form the cell cluster pattern.

In an optional embodiment, the above three-dimensional axis motion control system is also configured to adjust the immersion depth of the cured formed structure in the bio-ink, so as to ensure that the distance between the pre-cured position and the focal plane of the digital light source is in the range of light-curing forming; and adjust the repeated positioning for two adjacent pre-cured positions in the three directions of X/Y/Z in the bio-ink for accurate splicing.

In an optional embodiment, the above terminal equipment is also configured to obtain the imaging picture corresponding to the cell cluster pattern, and convert the imaging picture into a schematic view of simulated curing; and the above digital light source is also configured to issue the corresponding digital photomask according to the schematic view of simulated curing and then focus on the bottom surface of the acoustic resonating cavity to achieve selective curing of the cell cluster pattern, so as to obtain a cured formed structure.

The embodiment of the present disclosure has the following beneficial effects.

In the three-dimensional forming method and system thereof provided by the present disclosure, the acoustic wave and light-curing technology can be coupled. Firstly, the bio-ink in the acoustic resonating cavity is controlled by the acoustic wave to form a cell cluster pattern; and then the controllable light-curing is performed at the pre-cured position of the cell cluster pattern to obtain a cured formed structure. For the case where multiple times of curing are required, the steps including the transfer of the cured formed structure and the re-forming and curing of the cell cluster pattern can also be performed recurrently to reach the preset number of times. That is to say, through multiple times of transferring of the cured formed structure, and through controlling the bio-ink in the acoustic resonating cavity by acoustic waves to form a new cell cluster pattern and accurately splicing the same with the pre-cured position of the existing cell cluster pattern, and then performing controllable light-curing at the accurately spliced cell cluster pattern, a three-dimensional tissue structure is obtained finally. This method can pre-aggregate and pattern the cells in the bio-ink. On the one hand, it can improve the utilization of cells in the bio-ink, and the pre-aggregated cells are in close contact with each other, which can enhance the communication between cells. On the other hand, by providing a topological structure similar to real tissue, the bionic tissue structure can be effectively constructed. Moreover, this method can selectively cure the cell cluster pattern, such that a flexible curing for the patterned cells in the selective region is realized, which can avoid the interference of the cured structure on the subsequent cell patterning process, thereby effectively solving the difficulty of constructing a three-dimensional heterogeneous tissue structure based on the arrangement of cells by acoustic waves at this stage, and providing a new three-dimensional printing technology for cell clusters.

Additional features and advantages of the present disclosure will be set forth in the following description, and part will be obvious in the description, or can be learned by practice of the present disclosure. The objectives and other advantages of the present disclosure will be realized and attained by the structure particularly pointed out in the specification, the claims and the drawings.

In order to make the above-mentioned purpose, features, and advantages of the present disclosure more comprehensible, the preferred embodiments will be described in detail below together with the drawings.

BRIEF DESCRIPTION OF DRAWINGS

In order to more clearly illustrate the technical solutions in the specific embodiments of the present disclosure or the prior art, the drawings that need to be used in the description of the specific embodiment or the prior art will be briefly introduced below. Obviously, the drawings in the following description show some embodiments of the present disclosure, and those of ordinary skill in the art can obtain other drawings based on these drawings without inventive effort.

DETAILED DESCRIPTION OF EMBODIMENTS

The technical solutions of the present disclosure will be clearly and completely described below in conjunction with the embodiments. Apparently, the described embodiments are part of the embodiments of the present disclosure, not all of them. Based on the embodiments in the present disclosure, all other embodiments obtained by persons of ordinary skill in the art without inventive efforts belong to the protection scope of the present disclosure.

At present, in the field of tissue engineering, conventional 3D printing technology methods cannot control the cells in the gel filament material. The amount and position distribution of cells in the gel filament are random, controllable printing for the amount and position distribution of cells cannot be realized. During light-curing forming, the cells in the bio-ink are also randomly distributed and cells lack connection therebetween, such that the controllable printing for the amount and position of the cells cannot be accomplished. Moreover, current methods for manipulating, arranging, and three-dimensionally forming the cells based on acoustic waves are limited by the lack of a flexible curing control system after the cell patterned arrangement is completed, and the curing for the patterned cells in selective region is impossible, which leads to the inability of acoustic wave technology to construct heterogeneous tissue structures, thereby limiting the broad use of this technique in the field of tissue engineering.

Based on this, the embodiment of the present disclosure provides a three-dimensional forming method and system thereof, which can couple acoustic waves and light-curing technology to obtain a three-dimensional tissue structure. Not only the cell utilization rate in bio-ink can be improved, and the interaction between cells is enhanced, but the bionic tissue structure is also effectively constructed, and the patterned cells can be flexibly cured in selective region, which can avoid the interference of the cured structure on the subsequent cell patterning process, thereby effectively solving the difficulties with constructing three-dimensional heterogeneous issue structure based on cells arranged via acoustic wave at this stage.

In order to facilitate the understanding of this embodiment, at first, a three-dimensional forming system disclosed in the embodiment of the present disclosure will be introduced in detail.

Figure 1:
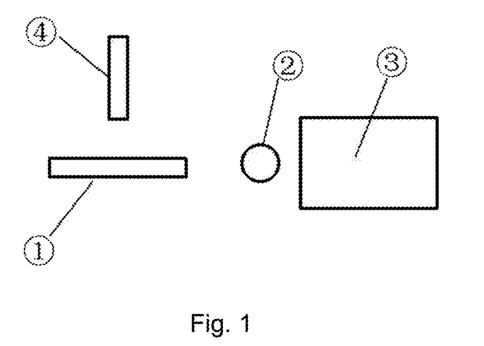
FIG. 1 is a schematic structural view of a three-dimensional forming system provided in the embodiment of the present disclosure.

FIG. 1 is a schematic view of a three-dimensional forming system provided by the embodiment of the present disclosure, wherein the system includes: an acoustic device ① and a light-curing control system; the acoustic device ① includes an acoustic resonating cavity for storing bio-ink; the light-curing control system includes a terminal equipment ②, a digital light source ③ and a three-dimensional axis motion control system ④; the acoustic device ① is configured to control the cells in the bio-ink in the acoustic resonating cavity to form cell cluster pattern through acoustic waves; the three-dimensional axis motion control system ④ is configured to transfer the cured formed structure, so as to replace the new bio-ink in the acoustic resonating cavity; and the terminal equipment ② and the digital light source ③ are configured to perform controllable light-curing processing at the pre-cured position of the cell cluster pattern to obtain the cured formed structure.

Figure 2:
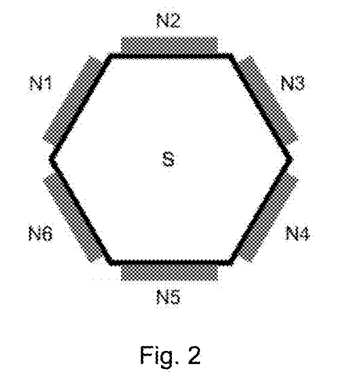
FIG. 2 is a schematic view of the acoustic device of the embodiment of the present disclosure.

The schematic view of the above-mentioned acoustic device is shown in FIG. 2. The acoustic device that can control the cell patterning includes transducer modules N1, N2, N3, N4, N5, N6, and a detachable acoustic resonating cavity S. In the embodiment of the present disclosure, the acoustic device including six transducer module is preferable, and the transducer module is selected as lead zirconate titanate piezoelectric ceramic sheet plated with silver electrodes on the surface.

The above acoustic device also includes a plurality of transducer modules, wherein the plurality of transducer modules are arranged on the periphery of the acoustic resonating cavity. Each transducer module is controlled by a circuit switch, wherein the circuit switch is configured to adjust the number of current working transducer modules, and the current input phase corresponding to each transducer module in a working state, such that the acoustic wave generated by the transducer module in the working state at the current input phase can control the cells in the bio-ink in the acoustic resonating cavity to form a cell cluster pattern.

The above-mentioned transducer module is preferably a metal-plated piezoelectric ceramic sheet, or an interdigital transducer, wherein the piezoelectric ceramic sheet is used to generate bulk acoustic waves, and the interdigital transducer is used to generate surface acoustic waves.

Figure 3:
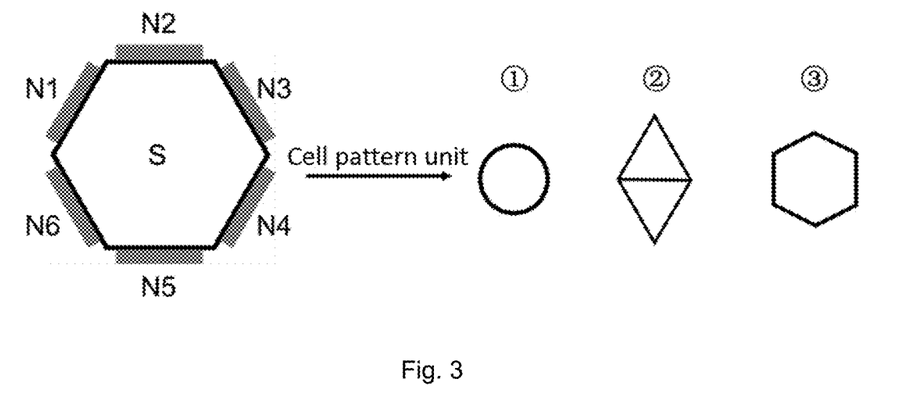
FIG. 3 is a diagram of the cell cluster pattern unit that can be provided by the acoustic device of the embodiment of the present disclosure.

The cell cluster pattern (P) arranged by the above-mentioned acoustic device is determined by the number of working transducer modules (N) and the input phase of the transducer module ($\phi_N$), which satisfies: increasing or decreasing the number of working transducer modules and adjusting the phase difference of the input signal (0-2π) can be used to construct more different cell cluster patterns. Specifically, when N=4, $\phi_{N1}=\phi_{N2}=0$, $\phi_{N4}=\phi_{N5}=\pi$, a dotted cell cluster pattern can be formed; when N=6, $\phi_{N1}=\phi_{N2}=\phi_{N3}=\phi_{N4}=\phi_{N5}=\phi_{N6}=0$, a circular cell cluster pattern can be formed, as shown in ① in FIG. 3; when N=6, $\phi_{N1}=\phi_{N2}=\phi_{N3}=0$, $\phi_{N4}=\phi_{N5}=\phi_{N6}=\pi$, a symmetrical triangular cell cluster pattern can be formed, such as ② shown in FIG. 3; and when N=3, $\phi_{N1}=\phi_{N2}=\phi_{N3}=0$, a hexagonal cell cluster pattern can be formed, as ③ shown in FIG. 3. Furthermore, the arrangement of the number of transducer modules is made into a chain module, which can realize the flexible adjustment for the number of working transducer modules, but the arrangement of the number of transducer modules in the embodiment of the present disclosure is not limited to this method.

The above-mentioned three-dimensional axis motion control system is also configured for adjusting the immersion depth of the cured formed structure in the bio-ink to ensure that the distance between the pre-cured position and the focal plane of the digital light source is in the range of light-curing forming, and adjusting the repeated positioning of the two adjacent pre-cured positions in the three directions of X/Y/Z in the bio-ink for accurate splicing.

Specifically, by adjusting the accuracy of repeated positioning of the three-dimensional axis motion control system in the X/Y/Z direction, the accurate splicing between the same layer or two adjacent layers of the cured structure in the three-dimensional tissue structure and the subsequent pre-cured structure in the Z direction is realized, so as to complete the printing for the multi-layer heterogeneous structure in the vertical axis direction. The accurate splicing of the same layer or two adjacent layers of the cured structure in the three-dimensional tissue structure with the subsequent pre-cured structure in the XY direction is realized, such that the printing of multi-layer heterogeneous structure in the horizontal axis direction is completed, thereby ensuring the accurate adjustment for the cured position region of the same layer or two adjacent layers of cell clusters in the printed three-dimensional tissue structure, the pores/channels between the cell clusters, the superimposed framework between layers and its connection structure.

The above-mentioned terminal equipment is also configured to obtain the imaging pictures corresponding to the cell cluster patterns, and convert the imaging picture into a schematic view of simulated curing; and the above-mentioned digital light source is also configured to issue a corresponding digital photomask according to the schematic view of simulated curing, and focus on the bottom surface of the acoustic resonating cavity to achieve selective curing of cell cluster patterns, so as to obtain the cured formed structures.

Specifically, after the cell pattern is completed under the action of acoustic waves, the cell cluster pattern is imaged by the camera; the terminal equipment is used to process the imaging picture of the cell cluster pattern, and the imaging picture is converted into a corresponding schematic view of simulated curing to highly match the cell cluster pattern with the digital photomask. After selecting the cell cluster pattern to be cured, the terminal equipment sends out instructions and transmits them to the digital light source; and the digital light source sends out the corresponding digital photomask according to the received schematic view of simulated curing, and focuses on the bottom surface of the acoustic resonating cavity to realize the selective curing of the cell cluster pattern. When the signal instruction of light-curing digital photomask is issued through the terminal equipment, the space matching the cell cluster can be pre-designed to ensure that the cured tissue structure has the pores or channels required to provide oxygen, nutrients, and formation of blood vessels for the cell cluster.

Further, for the terminal equipment to obtain the schematic view of simulated curing transformed by the cell cluster pattern formed by the acoustic wave, laser-based 3D printing technologies such as DLP, surface projection microstereolithography (PuSL), stereolithography (SL), three-dimensional photomask, and microscopic continuous projection (uCPP), can be used for curing and forming the three-dimensional tissue structures. If the SL technology is used, what is needed is to perform scanning and curing by single-head laser or multi-head laser according to the cell cluster pattern and designed three-dimensional tissue structure, that is, linear scanning and curing; and if the DLP technology is used, what is needed is to perform projection curing according to the cell cluster pattern and designed three-dimensional tissue structure, i.e., monolayer overall curing. The above-mentioned three-dimensional tissue structure includes the cured position region of the cell clusters, the pores/channels among the cell clusters, and the superimposed framework, and the connection structure between layers.

The three-dimensional forming system provided by the embodiment of the present disclosure can couple the acoustic wave and light-curing technology and can obtain multi-layer heterogeneous three-dimensional forming tissue structure, which can effectively improve the utilization rate of cells in the bio-ink, enhance the communication between cells, and realize the flexible curing at the selective region for the patterned cells, thereby avoiding the interference of the cured structure on the subsequent cell patterning process and effectively solving the difficulty of constructing a three-dimensional heterogeneous tissue structure based on the cells arranged via acoustic waves at the present stage.

Figure 4:
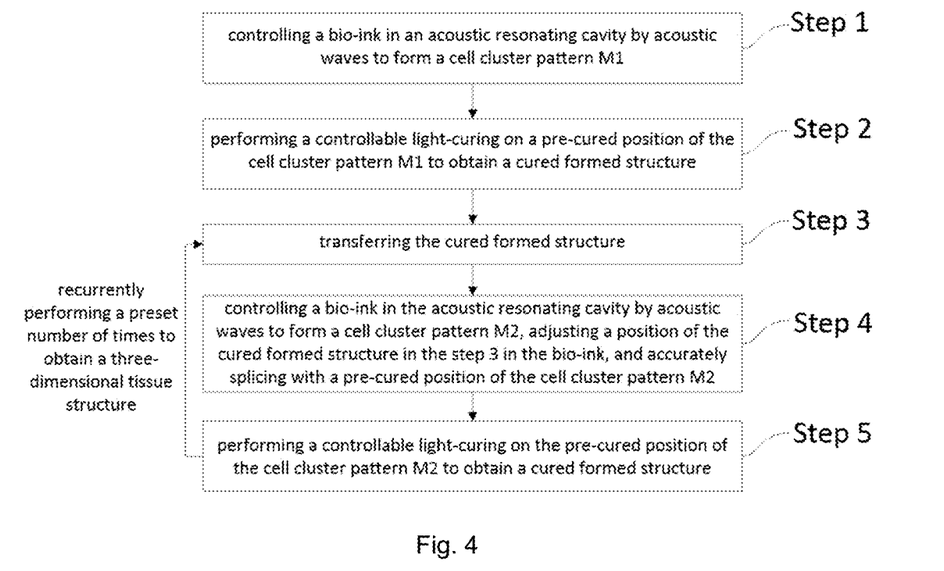
FIG. 4 is a flow chart of a three-dimensional forming method provided by the embodiment of the present disclosure.

On the basis of the above-mentioned embodiments of the system, the implementation process of a three-dimensional forming method provided by the embodiment of the present disclosure will be explained below. This method can realize the forming of single-layer tissue structure, and can also realize the forming of multi-layer tissue structure, wherein the tissue structures can be homogeneous or heterogeneous. As shown in FIG. 4, the method specifically includes the following steps.

Step 1: Controlling the bio-ink in the acoustic resonating cavity by acoustic waves to form a cell cluster pattern M1.

During specific implementation, the patterning of the bio-ink in the acoustic resonating cavity can be completed through the acoustic wave controlled by the acoustic device. The bio-ink in the acoustic resonating cavity can be selected or replaced according to actual needs. The above-mentioned step of controlling the bio-ink in the acoustic resonating cavity to form the cell cluster pattern by acoustic waves includes adjusting the number of current working transducer modules and the current input phase corresponding to each transducer module in a working state, so as to generate the acoustic wave by the transducer module in the working state under the current input phase to control the cells in the bio-ink in the acoustic resonating cavity to form a cell cluster pattern. The specific process of adjusting the number of working transducer modules and the input phase can refer to the detailed description in the aforementioned three-dimensional forming system, and will not be repeated here.

Step 2: Performing controllable light-curing on the pre-cured position of the cell cluster pattern M1 to obtain a cured formed structure.

The controllable light-curing in this step can be realized through the cooperation of the terminal equipment and the digital light source in the light-curing control system. The specific implementation process is as follows. The terminal equipment obtains the imaging picture corresponding to the cell cluster pattern and converts the imaging picture into a schematic view of simulated curing, and sends it to the digital light source; and the digital light source sends out a corresponding digital photomask according to the schematic view of simulated curing, and focuses on the bottom surface of the acoustic resonating cavity to achieve selective curing of cell cluster pattern, so as to obtain the cured formed structure.

Step 3: Transferring the cured formed structure.

The transfer of the cured formed structure can be realized through the three-dimensional axis motion control system in the above-mentioned light-curing control system, that is, after the selective curing of a cell cluster pattern is completed, the cured tissue structure is transferred from the acoustic resonating cavity by the three-dimensional axis motion control system. The acoustic resonating cavity filled with new bio-ink can be flexibly disassembled and replaced by means of a mechanical arm, parallel sliding switch, rotary sliding switch, etc., but is not limited to the above-mentioned methods.

After transferring the cured formed structure, determining whether to replace the bio-ink in the acoustic resonating cavity according to the design requirements of the three-dimensional tissue structure includes when a homogeneous three-dimensional tissue structure is printed, replacing the bio-ink in the acoustic resonating cavity according to the remaining amount of the bio-ink after use or required concentration of cells; when a heterogeneous three-dimensional tissue structure is printed, replacing the bio-ink in the acoustic resonating cavity according to the design requirements of the cell type in the three-dimensional tissue structure.

Step 4: Controlling the bio-ink in the acoustic resonating cavity by acoustic waves to form a cell cluster pattern M2, adjusting the position of the cured formed structure in step 3 in the bio-ink, and accurately splicing with the pre-cured position of the cell cluster pattern M2.

The accurate splicing of positions in the above step includes: when the two adjacent pre-cured positions are in the same layer, adjusting the immersion depth of the cured formed structure in the bio-ink to ensure that the distance between the top of the current printed layer structure and the focal plane of the digital light source is in the range of light-curing forming; and when the two adjacent pre-curing positions are in different layers, adjusting the immersion depth of the cured formed structure in the bio-ink to ensure that the distance between the bottom of the cured formed structure and the focal plane of the digital light source is in the range of light-curing forming.

Figure 5:
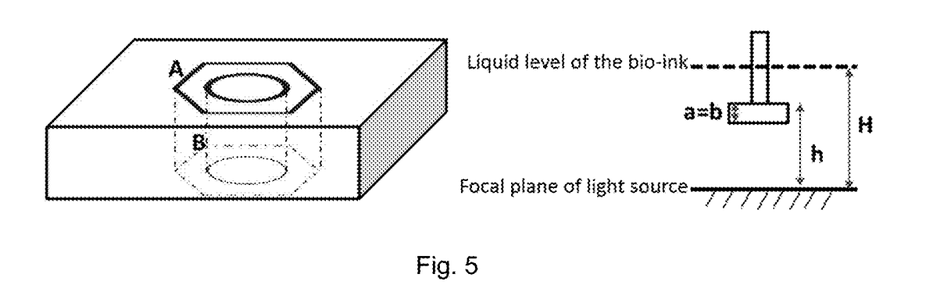
FIG. 5 is a schematic view of constructing the same-layer heterogeneous structure in the embodiment of the present disclosure.

Specifically, if the heights of two adjacent printing layers in the same layer are required to be the same and different cell cluster patterns are matched, as shown in FIG. 5, it is necessary to keep the distance between the top of the cured structure A immersed in the bio-ink and the focal plane of the light source to be in the range of light-curing forming, that is, the thickness of layer a of A meets $0 \leq a \leq h$, and the thickness of layer b of the pre-cured structure B meets $b=a$, such that the matching state of patterns of A and B meets the design requirements.

Figure 6:
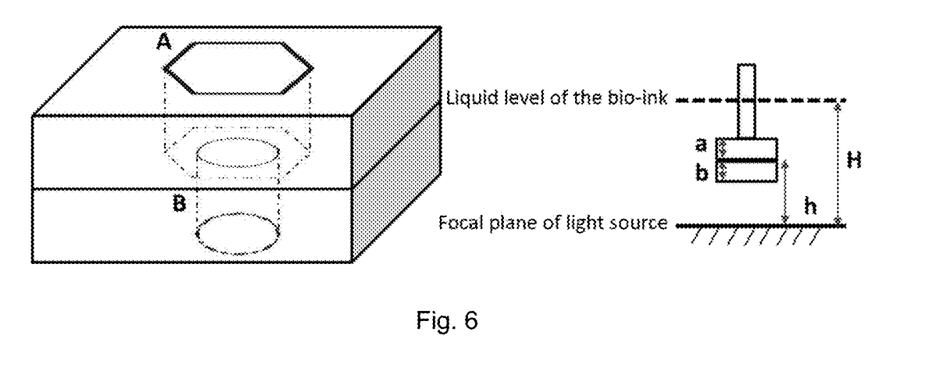
FIG. 6 is a schematic view of constructing two-adjacent-layer heterogeneous structure in the embodiment of the present disclosure.

If the splicing of different cell cluster patterns of two adjacent layers is required, as shown in FIG. 6, it is necessary to keep the distance between the bottom of the cured structure A immersed in the bio-ink and the focal plane of the light source to be in the range of light-curing forming to ensure the thickness of layer b of the pre-cured structure B in next layer meets $0 \leq b \leq h$, and ensure that the pattern and forming thickness of pre-cured structure B in the next layer meets the design requirements.

In the above, a is the thickness of a single layer of the cured structure A; b is the thickness of a single layer of the pre-cured structure B; h is the range of light-curing forming; and H is the depth of the bio-ink, wherein $h \geq H$.

The accurate splicing of positions in the above step also includes: the repeated positioning for two adjacent pre-cured positions in the three directions of X/Y/Z in the bio-ink for accurate splicing. It should be noted that the content contained in the same layer mentioned above is: 1) the layer heights of two adjacent pre-cured structures can be the same; and 2) two adjacent pre-cured structures are in an inclusion relationship, that is, their bottom or top surface can be the same and the layer heights are different, or they are in a complete inclusion relationship, that is, the two pre-cured structures have nothing to do with the bottom surface.

Step 5, performing controllable light-curing on the pre-cured position of the cell cluster pattern M2 to obtain a cured formed structure.

In the process of building a three-dimensional tissue structure, different light-curing effects can be achieved by adjusting the light source power and light-curing duration, and different light-curing accuracy can be achieved based on different 3D printing light-curing technologies. For example, when using DLP technology, the accuracy of light-curing mainly depends on the DMD micromirror and the size of the projection breadth, and the accuracy can be controlled in 2-100 μm; when LCD technology is used, the light-curing accuracy mainly depends on the LCD screen resolution, and the light-curing accuracy can reach 50 μm. The specific controllable light-curing process is the same as that in step 2, and will not be repeated herein.

By recurrently performing the above steps 3-5 for a preset number of times, a three-dimensional tissue structure can be obtained. In practical uses, different bio-inks can be selected and a different number of cycles can be set according to the specific structural requirements on the three-dimensional tissue structure.

Figure 7:
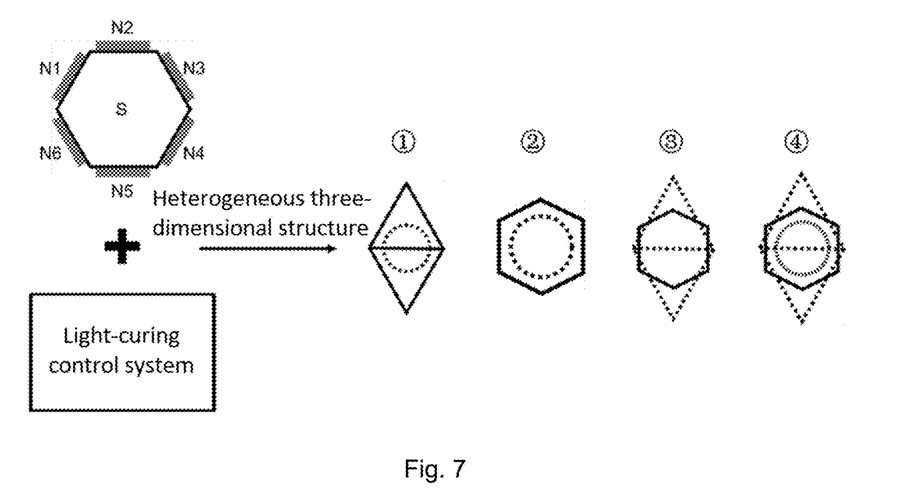
FIG. 7 is a schematic view of the three-dimensional forming system and method for forming heterogeneous three-dimensional structures provided in the embodiment of the present disclosure.

A specific example of use is listed below. FIG. 7 is a schematic view of the three-dimensional forming system and method provided by the embodiment of the present disclosure for forming the heterogeneous three-dimensional structure, which only shows that the three-dimensional forming structure has multiple patterns and heterogeneity feature. The patterning can be performed by accumulating and arranging the cells in the bio-ink by acoustic waves. The collected imaging picture of the cell cluster pattern is processed by the terminal equipment and converted into a schematic view of the simulated curing, and then the instruction is sent to the digital light-curing device, wherein the light-curing device generates a photomask signal to perform selective light-curing forming on the region of the patterned cell cluster. The cured structure is transferred through the three-dimensional axis motion control system. The acoustic resonating cavity loaded with new bio-ink is replaced, and the cells in the bio-ink are aggregated and arranged into specific different cell pattern units again by using the acoustic wave, and then the selective curing is performed with the help of the digital light-curing device to finally obtain a variety of heterogeneous structures, such as ①②③④ heterogeneous structure patterns in FIG. 7.

Figure 8:
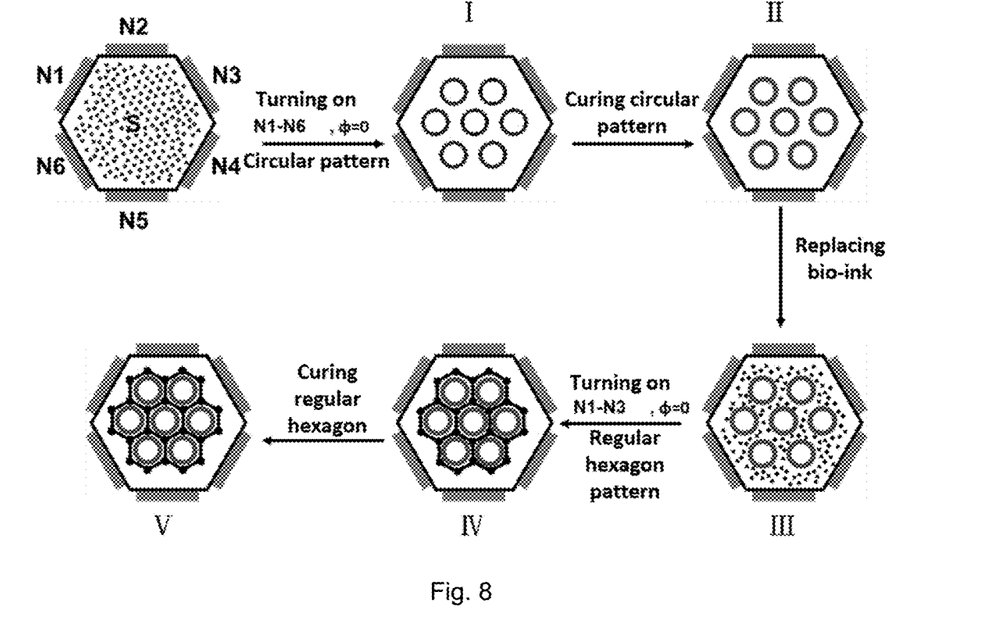
FIG. 8 is a schematic view of specific operation steps for forming the heterogeneous three-dimensional structure in the embodiment of the present disclosure.

FIG. 8 is a schematic view of the specific operation steps of forming the heterogeneous three-dimensional structure in the embodiment of the present disclosure. The bio-ink is stored in the acoustic resonating cavity S. The bio-ink is composed of cells and biomaterials, such as photosensitive hydrogel GelMA, HAMA, and other materials, which can be transformed from a liquid phase to a gel phase under light, thereby being cured and formed. The acoustic resonating cavity is preferably a regular hexagonal prism made of organic glass with six transducer modules connected around its periphery.

At present, the constructing of the heterogeneous three-dimensional structure (2 in FIG. 7 is taken as an example, and specific operation instructions are detailed as follows. First, the six transducer modules are adjusted to work at the same time, and their phase are controlled as $\phi=0$ to obtain a circular cell cluster pattern array (as shown in FIG. I). The imaging is performed by camera on the circular cell cluster pattern, and the image of the cell cluster pattern is processed by the terminal equipment. The image is converted into a corresponding schematic view of simulated curing. The terminal equipment issues instructions and transmits the schematic view of simulated curing to digital light source. The digital light source emits a photomask signal according to the received schematic view of simulated curing and focuses on the bottom surface of the acoustic resonating cavity to realize the selective curing of the circular cell cluster pattern (as shown in FIG. II). The cured tissue structure is transferred from the acoustic resonating cavity by using the three-dimensional axis motion control system, and the resonating cavity is replaced by one with new bio-ink (as shown in FIG. III). The acoustic signal is applied again to make only the three transducer modules N1, N2, and N3 work, and their phases are adjusted as $\phi=0$, to obtain a hexagonal cell cluster pattern (FIG. IV). The three-dimensional axis motion control system is used to lower the first cured tissue structure. By adjusting the translation of the X/Y/Z axis, the descending surface of the first layer of cured structure can be guaranteed. If the layer heights of two adjacent printings in the same layer are required to be the same and different cell cluster patterns are spliced, it is necessary to ensure that the distance between the top of the cured structure immersed in the bio-ink and the focal plane of the light source is in the range of light-curing forming, such that the matching state of the patterns of the pre-cured structure and the cured structure meets the design requirements. If different cell cluster patterns in two adjacent layers are to be spliced, it is necessary to keep the distance between the bottom of the cured structure immersed in the bio-ink and the focal plane of the light source in the range of light-curing forming, and ensure that the formed layer thickness and pattern matching state of the next layer of the pre-cued structure meet the design requirements. The light-curing control system is used again to generate a regular hexagonal image light signal, and the cell cluster pattern of a regular hexagon is selectively cured. The GelMA material in this region can be transformed from a liquid phase to a gel phase, thereby being cured and combined with the first cured structure to form a heterogeneous three-dimensional structure (as shown in Figure V).

The implementation principle and technical effect of the three-dimensional forming method provided by the embodiment of the present disclosure are the same as those of the foregoing system embodiments. For a brief description, the parts of the method embodiments not mentioned can refer to the corresponding content in the foregoing system embodiments.

Relative steps, numerical expressions, and values of components and steps set forth in these embodiments do not limit the scope of the present disclosure unless specifically stated otherwise.

When the functions are realized in the form of software function units and sold or used as independent products, they can be stored in a non-volatile computer-readable storage medium executable by a processor. Based on such understanding, the essentials of the technical solution of the present disclosure or the part that contributes to the prior art or the part of the technical solution can be embodied in the form of a software product, wherein the computer software product is stored in a storage medium, including several instructions used to make a computer device (which can be a personal computer, a server, or a network device, etc.) execute all or part of the steps of the methods described in each embodiment of the present disclosure. The aforementioned storage media include a USB flash drive, mobile hard disk, read-only memory (ROM), random access memory (RAM), disk or CD, and other media that can store program code.

In the description of the present disclosure, it should be noted that the terms "center", "upper", "lower", "left", "right", "vertical", "horizontal", "inner", "outer" etc. indicate the orientation or positional relationship based on the orientation or positional relationship shown in the drawings, and is only for the convenience of describing the present disclosure and simplification of the description, rather than indicating or implying that the referred device or element must be in a specific orientation, or constructed and operated in a specific orientation, therefore should not be construed as limiting the present disclosure. In addition, the terms "first", "second", and "third" are used for descriptive purposes only, and should not be construed as indicating or implying relative importance.

Finally, it should be noted that the above-described embodiments are only specific implementations of the present disclosure, they are used to illustrate the technical solutions of the present disclosure rather than limiting it, and the scope of protection of the present disclosure is not limited thereto. Although the present disclosure has been detailed referring to the aforementioned embodiment, those of ordinary skill in the art should understand that any person of ordinary skill in the art can still modify the technical solutions described in the foregoing embodiments or easily think of changes within the technical scope disclosed in the present disclosure, or equivalent replacements can be made to some of the technical features; and these modifications, changes or replacements do not make the essence of the corresponding technical solutions deviate from the spirit and scope of the technical solutions of the embodiments of the present disclosure, and should be covered within the scope of protection of the present disclosure. Therefore, the protection scope of the present disclosure should be based on the protection scope of the claims.

What is claimed is:

1. A three-dimensional forming method, wherein the method comprises:
   step 1: controlling a bio-ink in an acoustic resonating cavity by acoustic waves to form a cell cluster pattern M1;
   step 2: performing a controllable light-curing on a pre-cured position of the cell cluster pattern M1 to obtain a cured formed structure;
   step 3: transferring the cured formed structure;
   step 4: controlling a bio-ink in the acoustic resonating cavity by acoustic waves to form a cell cluster pattern M2, adjusting a position of the cured formed structure in the step 3 in the bio-ink, and accurately splicing with a pre-cured position of the cell cluster pattern M2;
   step 5: performing a controllable light-curing on the pre-cured position of the cell cluster pattern M2 to obtain a cured formed structure; and
   recurrently performing steps 3-5 above for a preset number of times to obtain a three-dimensional tissue structure.

2. The method according to claim 1, wherein the step of controlling the bio-ink in the acoustic resonating cavity by the acoustic waves to form the cell cluster pattern comprises:
   adjusting a number of current working transducer modules, and adjusting a current input phase corresponding to each transducer module in a working state, so that an acoustic wave generated by transducer modules in the working state under the current input phase controls cells in the bio-ink in the acoustic resonating cavity to form the cell cluster pattern.

3. The method according to claim 1, wherein, in the step 3, after transferring the cured formed structure, according to design requirements on the three-dimensional tissue structure, determining whether to replace the bio-ink in the acoustic resonating cavity comprises:
   when printing a homogeneous three-dimensional tissue structure, replacing the bio-ink in the acoustic resonating cavity according to a remaining amount of the bio-ink after use or cell concentration requirements; and
   when printing a heterogeneous three-dimensional tissue structure, replacing the bio-ink in the acoustic resonating cavity according to design requirements for cell types in the three-dimensional tissue structure.

4. The method according to claim 1, wherein, in the step 4, an accurate splicing for positions comprises:
   when two adjacent pre-curing positions are on a same layer, adjusting an immersion depth of the cured formed structure in the bio-ink to ensure that a distance between a top of a current printing layer structure and a focal plane of a digital light source is in a range of light-curing forming; and
   when two adjacent pre-curing positions are in different layers, adjusting an immersion depth of the cured formed structure in the bio-ink to ensure that a distance between a bottom of the cured formed structure and the focal plane of the digital light source is in the range of light-curing forming.

5. The method according to claim 1, wherein, in the step 4, an accurate splicing for positions further comprises:
   a repeated positioning for two adjacent pre-curing positions in three directions of X/Y/Z in the bio-ink for the accurate splicing.

6. The method according to claim 1, wherein the step of performing the controllable light-curing on the pre-cured position of the cell cluster pattern to obtain the cured formed structure comprises:
   obtaining an imaging picture corresponding to the cell cluster pattern, and converting the imaging picture into a schematic view of a simulated curing; and
   according to the schematic view of the simulated curing, issuing a corresponding digital photomask and focusing on a bottom surface of the acoustic resonating cavity to realize a selective curing of the cell cluster pattern to obtain the cured formed structure.

* * * * *